United States Patent [19]
Richter

[11] Patent Number: 5,740,995
[45] Date of Patent: Apr. 21, 1998

[54] DEVICE FOR SUPPORTING OBJECTS

[76] Inventor: Herbert Richter, Drosselweg 8, 75331 Engelsbrand, Germany

[21] Appl. No.: 670,459

[22] Filed: Jun. 26, 1996

[51] Int. Cl.⁶ ............................................. F21V 21/00
[52] U.S. Cl. ............... 248/220.21; 248/207; 248/222.11; 248/225.11
[58] Field of Search .................. 248/207, 220.21, 248/221.11, 222.11, 222.12, 224.8, 223.21, 225.11, 288.51, 309.1, 288.31

[56] References Cited

U.S. PATENT DOCUMENTS

| | | | |
|---|---|---|---|
| 386,749 | 7/1888 | Johnson | 248/222.11 X |
| 2,209,653 | 7/1940 | Larsson | 248/224.8 X |
| 2,980,381 | 4/1961 | Dectrow et al. | 248/223.21 |
| 3,564,984 | 2/1971 | Alexander | 248/207 X |
| 4,071,217 | 1/1978 | Kongelka | 248/309.1 |
| 4,697,774 | 10/1987 | Sarton et al. | 248/224.8 X |
| 4,733,330 | 3/1988 | Tanaka et al. | 248/222.12 X |
| 4,786,025 | 11/1988 | Shuman | 248/222.12 X |

FOREIGN PATENT DOCUMENTS

| | | | |
|---|---|---|---|
| 221202 | 10/1957 | Australia | 248/224.8 |
| 2026850 | 2/1980 | United Kingdom | 248/223.21 |

*Primary Examiner*—Derek J. Berger
*Attorney, Agent, or Firm*—Klaus J. Bach

[57] ABSTRACT

A device for supporting objects, especially objects such as utilized in vehicles, boats and the like, comprising a base adapted to be mounted on a substrate, for example, a dashboard or console, and a carrier member for supporting said objects and which includes means for retaining an object supported thereon securely in place. The carrier member and the base have formed thereon interlocking elements for interlocking the carrier member with the base, said interlocking elements being disengageable to permit removal of the carrier member from the base. The interlocking elements are arrayed such to allow the carrier member to be mounted on and interlocked with the base in different posi-tions angularly displaced from one another.

10 Claims, 2 Drawing Sheets

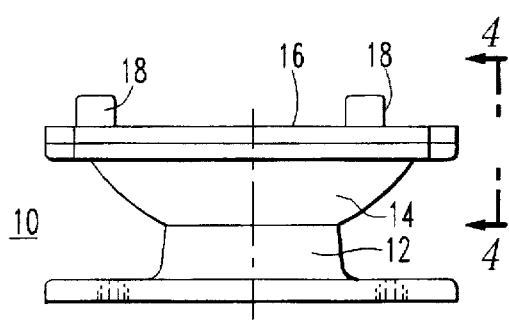
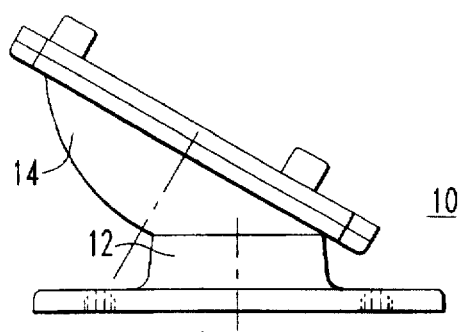
FIG. 1   FIG. 2
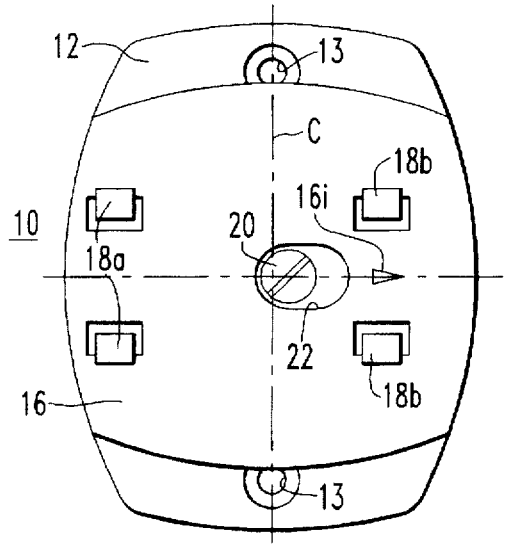
FIG. 3
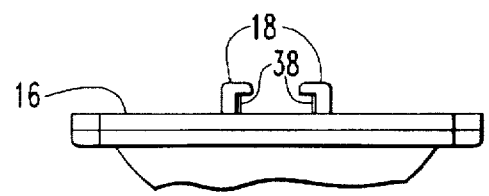
FIG. 4
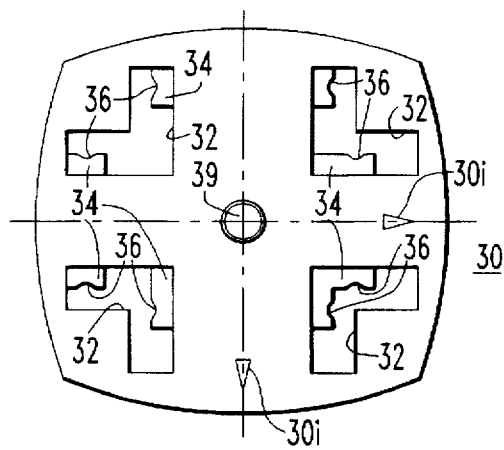
FIG. 5
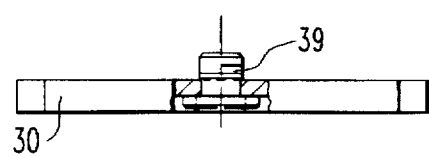
FIG. 6
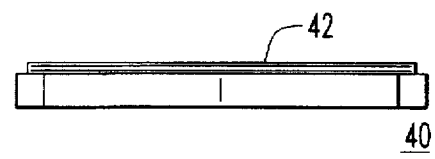
FIG. 9

DEVICE FOR SUPPORTING OBJECTS

BACKGROUND OF THE INVENTION

The present invention relates to a device for supporting objects, particularly objects such as beverage cups, writing pads, compasses, mobile telephones, cameras, camcorders, and the like.

Devices for supporting objects, as in vehicles, are known. Basically, these conventional devices usually are unitary assemblies including means for mounting them on a suitable substrate, such as a door or the dashboard or console of an automobile, and some structure for supporting a particular kind of object. Such unitary assemblies do not readily lend themselves to being used, or adapted to be used, with objects for which they were not specially designed.

The present invention has for its principal objective to provide an improved supporting device, one which is suitable for use with a great variety of objects and still is simple and inexpensive to make.

SUMMARY OF THE INVENTION

The device according to the invention comprises a plate-like carrier member for supporting objects and which includes retaining means for holding the objects supported thereon firmly in place, and a base for removably supporting the carrier member, the carrier member and the base including interlocking means adapted to be engaged so as to interlock the carrier member with the base, and to be disengaged so as to release the carrier member for removal thereof from the base.

The interlocking means comprise a first array of interlocking elements disposed on the base, and a second array of inter-locking elements disposed on the carrier member, the arrangement being such as to enable the carrier member to be positioned on and interlocked with the base in different positions angularly displaced from each other. In some of these angular positions, the carrier member is centered on the base when interlocked therewith; preferably, the base and the carrier member are provided with indicia for facilitating placement of the carrier for movement to the centered positions thereof.

The carrier member with the interlocking elements thereon, and the base with the interlocking elements thereon, are separate unitary structures which can be formed, such as molded, from a suitable plastics material.

The retaining means on the carrier member may comprise a tripod-socket screw and/or a suitable self-adhesive material, preferably self-adhesive foil.

In one of the preferred embodiments still to be described, the base includes a tilt section having said first array of interlocking elements disposed thereon, and in another embodiment it comprises a plate.

The improved device including these features is indeed simple and inexpensive to make, and it has great utility insofar as it can be readily adapted for use with a great variety of different kinds of objects, objects with tripod sockets, such as cameras and camcorders or the like, and various objects without tripod sockets, such as cup holders, writing pads, compasses, mobile-telephone holders, and many more. Moreover, since the carrier member or plate can be mounted on and interlocked with the base in different positions angularly displaced from each other, it offers greater freedom in choosing where and how to mount the device on a given substrate. The carrier plate, being removable, can also be easily replaced, if damaged, without necessitating the replacement of the whole device including the base, and it can be readily interchanged with other carrier plates retaining the same arrangement of interlocking elements but otherwise designed to accommodate additional kinds of objects.

The invention will become more readily apparent from the following description of preferred embodiments thereof described, by way of example only, with reference to the accompanying drawings.

BRIEF DESCRIPTION OF THE DRAWINGS

FIG. 1 is a side view of a base including a tilt section with interlocking elements disposed thereon;

FIG. 2 is a similar view showing the tilt section in a tilted position;

FIG. 3 a top view of the base shown in FIGS. 1 and 2;

FIG. 4 is a partial side view of the base as seen along line 4—4 in FIG. 1;

FIG. 5 is a top view of a carrier member;

FIG. 6 is a side view of the carrier member, with a center portion thereof shown partially in cross-section;

FIG. 9 is a side view of a somewhat modified version of the carrier member;

DESCRIPTION OF THE PREFERRED EMBODIMENTS

Figure 7:
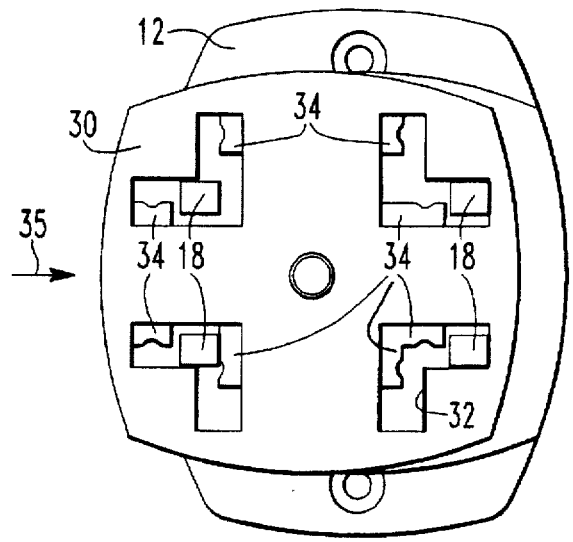
FIG. 7 is a top view of the device embodying the invention, showing the carrier member positioned upon the base but not interlocked therewith.

With particular reference to FIGS. 1–4, the base shown therein and generally designated with reference numeral 10 comprises a lower base section 12 and a tilt section 14. The base section 12 is provided with holes 13 for receiving fasteners, such as screws (not shown), used to secure the base 10 to a suitable substrate, such as the dashboard or console of a vehicle. In addition to or instead of such screw holes, the base section 12 may have applied to the bottom thereof a self-adhesive foil suitable for cementing the base 10 to the substrate.

The tilt section 14 is suitably supported on the base section 12 so as to be tiltable to various positions in which it can be held through the action of a manually operable clamping screw 20 (FIG. 3) accessible through an opening 22 formed in a top portion of the tilt section. Disposed on an upper substantially planar surface 16 of the tilt section 14 are four rectangularly arrayed interlocking elements 18 each shaped generally as an inverted L (see FIG. 4). As best seen from FIG. 4, the interlocking elements 18 are so oriented that the distal legs of each pair of inverted-L-shaped elements 18a or 18b (FIG. 3) at the minor sides of the rectangle are directed toward each other.

Referring now to FIG. 5, the carrier member illustrated therein and generally designated with reference numeral 30 comprises a plate which has formed therein four generally L-shaped apertures 32 each adapted to receive one of the interlocking elements 18 at a time. The carrier plate 30 further includes interlocking elements 34 in the form of lugs disposed in the apertures 32 and adapted to be engaged with the interlocking elements 18 received therein. When it is desired to mount the carrier member 30 on the base and to interlock it therewith, the carrier member is first placed flat, i.e. in a lying position, upon the surface 16 of the base such that the interlocking elements 18 on the base extend into free (i.e., unoccupied by lugs 34) spaces within the respective apertures 32, as shown in FIG. 7. Then, a force is applied to the carrier plate 30 to move it in the direction of the arrow 35, i.e., a direction parallel to the surface 16, thereby causing the interlocking elements or lugs 34 thereon to slide beneath and into interlocking relationship with the distal legs of the inverted-L-shaped inter-locking elements 18, as shown in FIG. 8.

Preferably, the interlocking elements 34 are provided with indentations 36 (see FIG. 5) formed in edge portions thereof, and the interlocking elements 18 are provided with protuberances 38 (see FIG. 4) adapted to mate with the indentations 31 when the carrier plate 30 is interlocked with the base. The protuberances 38 and indentations 36 are designed to enhance, through their interaction, the interlocking action of the engaged interlocking elements 18 and 34 yet still to permit the latter to become disengaged upon application of a sufficient force to the carrier plate 30 in a direction opposite to the one indicated by the arrow 35.

Figure 8:
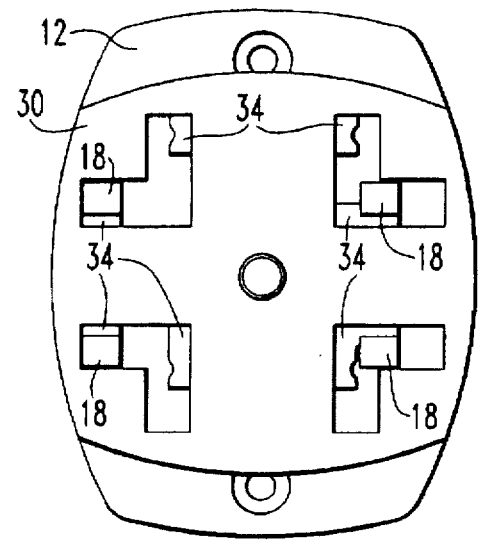
FIG. 8 is a plan view similar to FIG. 7 but showing the carrier member interlocked with the base.

As readily apparent from FIGS. 7 and 8, for each inverted-L-shaped interlocking element there are provided two lugs 34 disposed at an angle with respect to one another such that the carrier plate 30 can be mounted on and interlocked with the base 10 in four different positions angularly displaced from each other by about 90 degrees. When positioned as shown in FIG. 8, the carrier plate 30 is centered on the base. It would be similarly centered if disposed in a position displaced 90 degrees counterclockwise from the one shown. In each of the other two interlocking positions, however, the carrier member 30 will be off-center by being laterally offset from the centerline C (FIG. 3). In order to facilitate proper placement of the carrier plate 30 on the base for movement to either one of its centered positions, it preferably is provided with indicia 30i (FIG. 5) adapted to be aligned with a corresponding indicium 16i on the base 10. As noted hereinbefore, the carrier member 30 includes retaining means for holding an object placed thereon securely in place. In the embodiment illustrated in FIGS. 5-6, the retaining means comprises a screw 39 threadedly engageable with a tripod-socket such as commonly used on cameras and camcorders, for example. The screw 40 may be captively retained on the carrier plate 30.

The carrier member shown in FIG. 9 and generally designated with numeral 40 has no tripod-socket screw, the retaining means therein comprising self-adhesive material, preferably a self-adhesive foil 42, applied to the upper surface of the carrier member for the purpose of retaining objects which have no tripod socket, for example, a cup holder, a compass, a mobile telephone holder or the like. Except for this one feature, the carrier member 40 of FIG. 9 is essentially identical to the carrier member 30 hereinbefore described with reference to FIG. 5. It will be appreciated that the carrier plate 30 could be easily modified to serve the same purpose as the carrier member 40, simply by applying self-adhesive material upon the upper surface thereof after removing the tripod-socket screw 39 or even while retaining it if it will not interfere with any of the intended uses of the carrier plate. The self-adhesive foil preferably used for this and similar purposes mentioned herein is the kind that has a non-adhesive, peelable cover or masking layer disposed thereon.

Figure 10:
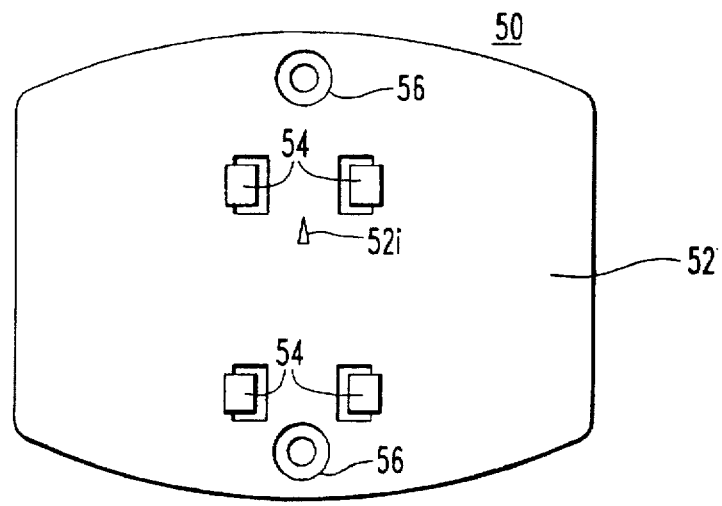
FIG. 10 is a plan view of a non-tilt base suitable for use with the device embodying the invention.
Figure 11:
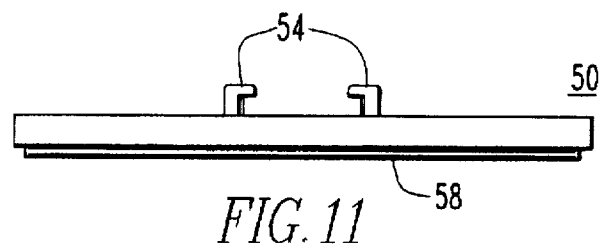
FIG. 11 is a side view of the base shown in FIG. 10.

Referring now to FIGS. 10 and 11, the non-tilt base shown therein and generally designated with numeral 50 comprises a simple plate 52 including means (screw holes 56 as shown in FIG. 10 and/or self-adhesive foil 58 as shown in FIG. 11) for securing the plate 52 to a suitable substrate, and interlocking elements 54 which are essentially identical to the interlocking elements 18 employed in the previous embodiment described herein. The base plate 52 is provided also with an indicium 52i corresponding to the indicium 16i shown in FIG. 3.

All of the parts described herein, with the possible exception of the screws 20 (FIG. 3) and 39 (FIGS. 5-6), may be formed, such as molded, from a suitable plastics material.

Finally, it should be noted that the interlocking elements 18 and 34 shown herein as disposed on the base and the carrier plate, respectively, could conceivably be disposed on the carrier plate and the base, respectively, and that the indentations 36 and protuberances 38 shown herein as disposed on the interlocking elements 34 and 18, respectively, could conceivably be disposed on the interlocking elements 18 and 34, respectively.

What is claimed is:

1. A device for supporting objects, comprising a plate-like carrier member for supporting said objects, said carrier member including retaining means for holding the object supported thereon securely in place, a base having a substantially planar surface for removably supporting the plate-like carrier member thereon in lying position, and interlocking means for releasably interlocking said carrier member with said base, said interlocking means comprising a first array of interlocking elements disposed on said base, and a second array of interlocking elements disposed on said plate-like carrier member, the interlocking elements of one of said first and second arrays being shaped generally as inverted Ls, and the interlocking elements of the other array comprising lugs arranged so as to be slidable into and out of interlocking engagement with said inverted-L-shaped interlocking elements through movement of said plate-like carrier member on, and in a direction parallel to, said substantially planar surface.

2. A device according to claim 1, wherein for each inverted-L-shaped interlocking element there are provided two of said lugs disposed at a right angle with respect to one another such as to enable the plate-like carrier member to be positioned on said substantially planar surface and releasably interlocked with said base in different positions angularly displaced from one another.

3. A device according to claim 2, wherein said different positions include centered positions in which said carrier member is centered on said base when interlocked therewith, and off-center positions in which the carrier member is off-center with respect to the base when interlocked therewith, said carrier member and said base including indicia for facilitating placement of the carrier member on the base for movement to any of the centered positions.

4. A device according to claim 1, wherein the interlocking elements of one of said first and second arrays have indentations formed therein, and the interlocking elements of the other array have formed thereon protuberances so disposed as to mate with said indentations when the carrier member is in interlocking relationship with the base.

5. A device according to claim 1, wherein said retaining means comprise a screw threadedly engageable with a tripod socket.

6. A device according to claim 1, wherein said retaining means comprises self-adhesive foil material.

7. A device according to claim 1, wherein said base includes a tilt section, said substantially planar surface and said first array of interlocking elements being disposed on said tilt section.

8. A device according to claim 1, wherein said base comprises a plate having said first array of interlocking elements disposed thereon.

9. A device according to claim 1, wherein said inverted-L-shaped interlocking elements are disposed on said substantially planar surface of the base, and said plate-like carrier member has formed therein a plurality of apertures for receiving the inverted-L-shaped interlocking elements when the carrier member is placed flat upon said surface, said lugs being disposed within said apertures of the carrier member.

10. A device according to claim 9, wherein each of said apertures is generally L-shaped and with each leg thereof having one of said lugs disposed therein.

* * * * *